United States Patent [19]

Maschio

[11] 4,048,696
[45] Sept. 20, 1977

[54] SHRIMP SHELLER

[75] Inventor: Joseph Maschio, Rutherford, N.J.

[73] Assignee: Master Machine & Manufacturing Co., Belleville, N.J.

[21] Appl. No.: 701,880

[22] Filed: July 1, 1976

[51] Int. Cl.² .................................................. A22C 29/02
[52] U.S. Cl. ............................................... 17/69; 17/73
[58] Field of Search ................. 17/66, 69, 73–76, 17/48, 52, 71; 7/1 H; 30/280, 286, 289, 294

[56] References Cited

U.S. PATENT DOCUMENTS

| 322,755 | 7/1885 | Seaman | 30/294 |
|---|---|---|---|
| 1,099,885 | 6/1914 | Peple | 30/294 |
| 2,439,639 | 4/1948 | Tilly | 30/289 UX |
| 2,610,399 | 9/1952 | Adams et al. | 30/286 |
| 3,178,765 | 4/1965 | Gorton | 17/69 |
| 3,353,207 | 11/1967 | Weinberger | 17/69 |
| 3,831,274 | 8/1974 | Horrocks | 30/294 X |

Primary Examiner—David H. Brown
Attorney, Agent, or Firm—Popper & Bobis

[57] ABSTRACT

A shrimp sheller having a probe for insertion into the body of a decapitated shrimp between the shell and the flesh, to be moved toward the tail; a sharp offset portion perpendicular to the probe slices through the shell from end to end as the probe is advanced through the tail, enabling the shell to be easily stripped off the body.

4 Claims, 5 Drawing Figures

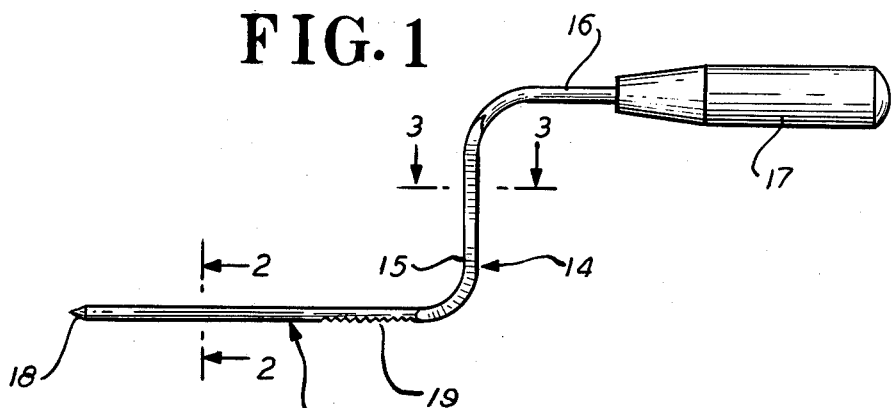
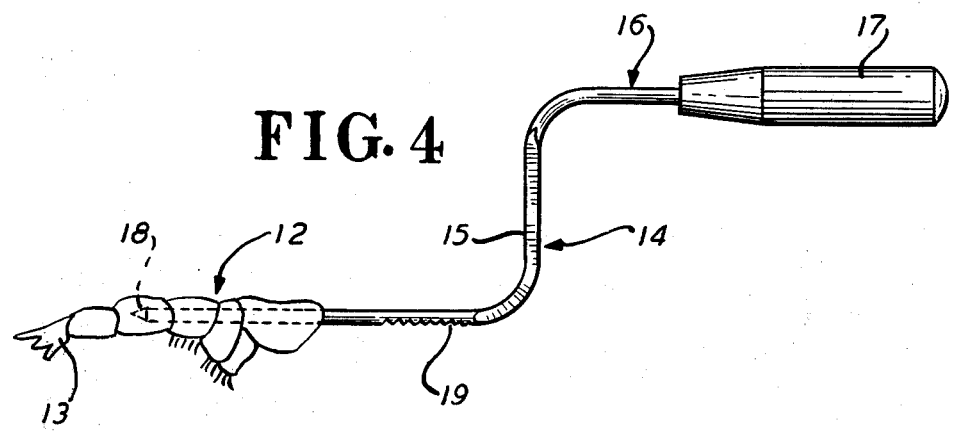
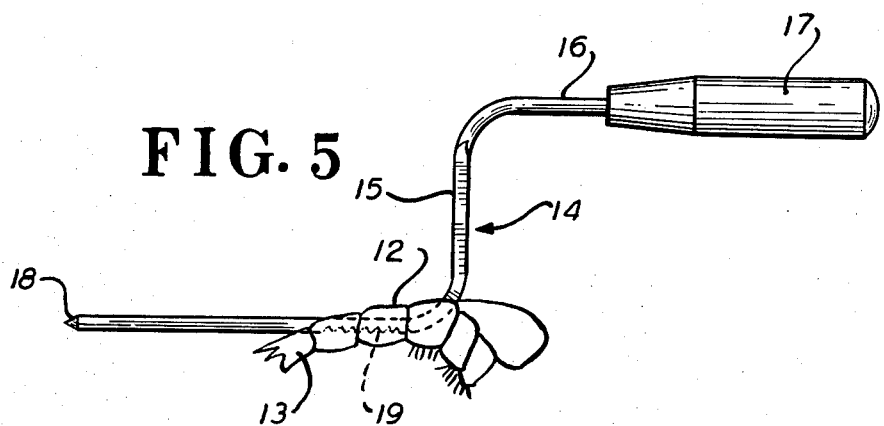

SHRIMP SHELLER

BACKGROUND OF INVENTION

1. FIELD OF INVENTION

This invention relates generally to shrimp shellers, and more particularly to such devices having a vertically disposed sharp edge following an insertable probe preceding the sharp edge.

2. DESCRIPTION OF PRIOR ART

The job of shelling shrimp is the subject of numerous patents. The simplest device is disclosed in Paoli, U.S. Pat. No. 2,648,094, which shows a plain wedge provided with a top cutting surface, which runs generally parallel to the shell of the shrimp; it is usually quite ineffective to slice the shell unless the shell is very forcibly pulled downwardly over the cutting surface. This is especially difficult with large size shrimp with a heavy shell. Usually, the shell is not cut at all, but is detached from the flesh, and the flesh is pushed out of the shell by the increased width of the wedge.

The patent to Weinberger, U.S. Pat. No. 2,647,278 is an example of a shrimp sheller wherein a pair of jaws are inserted between the flesh and shell of a shrimp body, and then the jaws are expanded to pop the shell off. In use, the expanding of the jaws may be dispensed with, for the shell may be freed from the flesh at least on one side, but left adherent on the other. In reality, this device functions something like Paoli, in that the jaws have increasing height from tip to handle, and thus wedge the shrimp shell loose. These are typical of other patents for shrimp shellers.

SUMMARY OF INVENTION

It has been found that a shrimp sheller can be constructed that has a probe which does not increase in height from end to end, has no wedging effect, but is a uniformly thick, elongated rod of small cross-sectional area easily inserted between the shell and flesh of a shrimp-body, and easily moved through the body. There is an offset, portion generally perpendicular to the probe portion, which has a forwardly addressed knife edge surface, directed to encounter the shell of the shrimp. Since this sharp edge is much higher than the flesh of the shrimp, the shell must encounter and move beyond the knife-edge in order to move off of the probe, and in so doing, the shell is cut full length so that the flesh is easily removed from the shell which is cut lengthwise. The handle enables the sheller to be easily guided through the shell, which must yield to the knife blade; there are no moving parts to be manipulated.

DRAWINGS

These objects and advantages, as well as other objects and advantages, may be attained by the device shown by way of illustration in the drawings in which:

FIG. 1 is a side elevational view of the shrimp sheller;

FIG. 2 is a cross-sectional view of the probe, taken on the line 2—2 in FIG. 1, looking in the direction of the arrows;

FIG. 3 is a cross-sectional view of the blade, taken on the line 3—3 in FIG. 1, looking in the direction of the arrows, showing the blade-portion;

FIG. 4 is a view the same as FIG. 1, but with a shrimp impalled; and

FIG. 5 is a view the same as FIG. 4, but with the shrimp further advanced on the probe,, encountered by the blade, and partially sliced through.

PREFERRED EMBODIMENT

Referring to the drawings in detail, the shrimp sheller provides a rod made of metal which is relatively rigid. It has a first portion 11 which defines a probe, dimensioned to be inserted into the body of a shrimp 12 between the shell thereof and the flesh, in the direction of the tail 13. The first portion 11 is preferably provided with a generally circular, uniformly thick cross-sectional area although it may have a different uniform cross-sectional area; it may be somewhat flattened top and bottom, or it may be somewhat arcuate to conform to the normal curvature of the body of the average shrimp. The shrimp are usually supplied by the dealer decapitated, as shown in the figures but unshelled and not deveined.

The second portion 14 of the device is an offset, bent portion extending upwardly from the first portion 11 and in general perpendicularity to the first portion 11. A sharp edge 15 is provided on the second portion 14 facing in the direction of the first portion 11, so that when a shrimp is impalled on the probe 11, and moved toward the second portion 14, the shell will encounter the sharp edge 15 and be cut from the head-end to the tail-end 13. At the top of the second portion 14, a third portion 16 is provided; it is generally parallel with the first portion 11 but extends in the opposite direction from the first portion 11, from the second portion 14. Mounted on the third portion 16, there is a handle 17 for convenience in manipulating the shrimp sheller.

The first, second, and third portions 11, 14, 16 are formed of one bent piece of relatively rigid metal. A rigid plastic material may also be used, although the sharp edge 15 may initially be very sharp, and will remain sharp longer, if metal is used. The outer end of the first portion 11 may be provided with a pointed tip 18 for ease in inserting the probe 11 between the shell and the flesh of the shrimp body 12. By moving the shrimp body 12 along the first portion 11, toward the sharp edge, the shell is neatly cut in halves from end to end, and the flesh is easily removed from the shell, with the legs. Serrations 19 may be applied to the bottom of the first portion 11, and these may remove the black vein from the body, without an additional operation.

What is claimed is:

1. A shrimp sheller device comprising
   a. a first portion of a device defining a probe having a generally uniform cross-sectional area from one end to the other, dimensioned to be inserted into the body of a shrimp toward the tail, between the shell and the flesh,
   b. a second portion of the device extending generally perpendicular to the first portion,
   c. an integral sharp edge on the second portion of the device facing toward the first portion, and generally perpendicular thereto,
   d. a third portion of the device defining a handle extending from the second portion in the opposite direction to the first portion and disposed in general parallelism to the first portion.

2. A shrimp sheller comprising the device according to claim 1 in which the first portion has a generally circular cross-sectional area.

3. A shrimp sheller comprising the device according to claim 1 which the first portion has a pointed tip.

4. A shrimp sheller according to claim 1 in which serrations are formed on at least a portion of the bottom of the probe.

* * * * *